Figure 1:
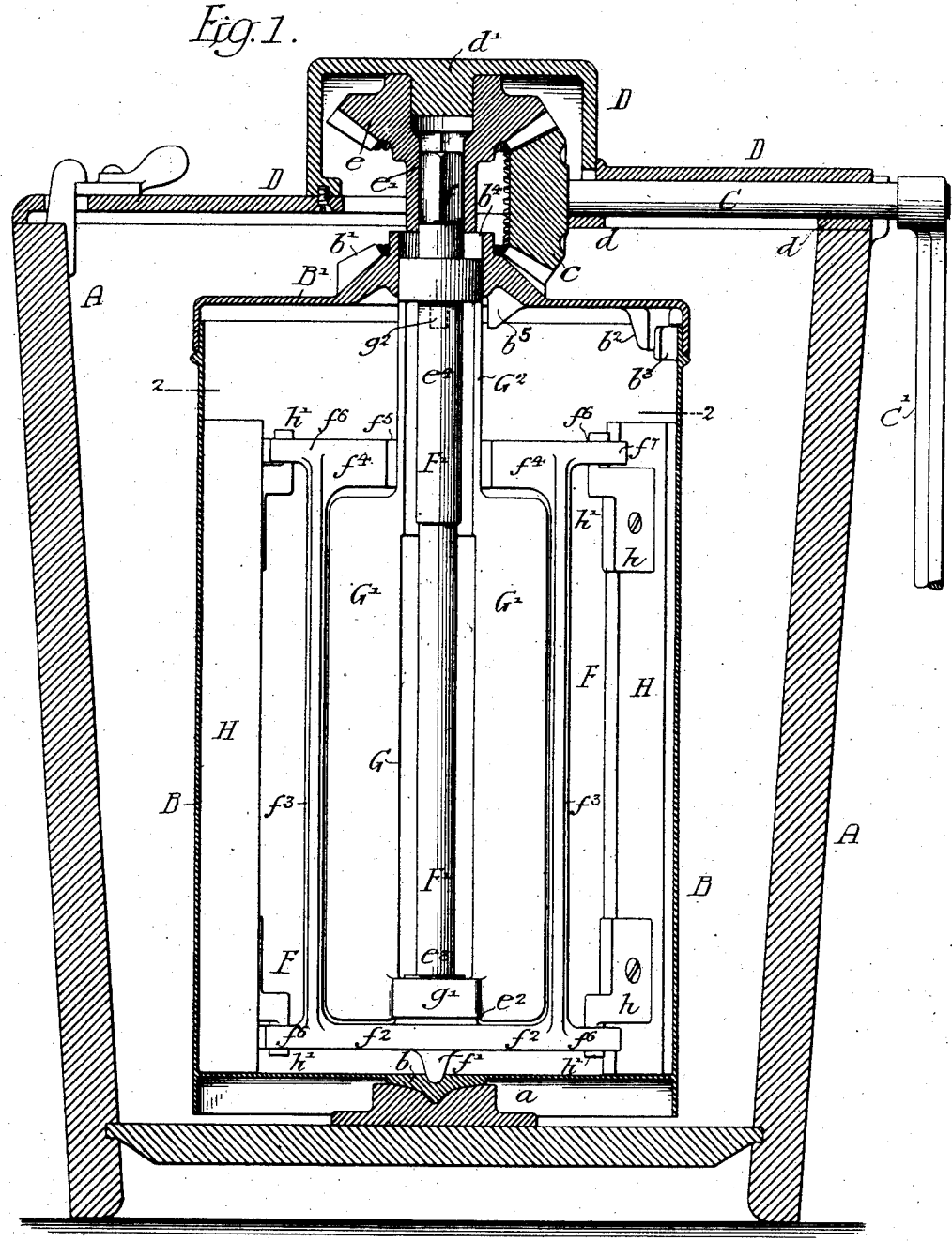

No. 882,936. PATENTED MAR. 24, 1908.
T. J. FEGLEY.
ICE CREAM FREEZER.
APPLICATION FILED APR. 10, 1906.

2 SHEETS—SHEET 1.

Witnesses:-
Augustus B. Cppes
Hamilton D. Turner

Inventor.-
Thomas J. Fegley.
by his Attorneys,
Howson & Howson

No. 882,936. PATENTED MAR. 24, 1908.
T. J. FEGLEY.
ICE CREAM FREEZER.
APPLICATION FILED APR. 10, 1906.
2 SHEETS—SHEET 2.
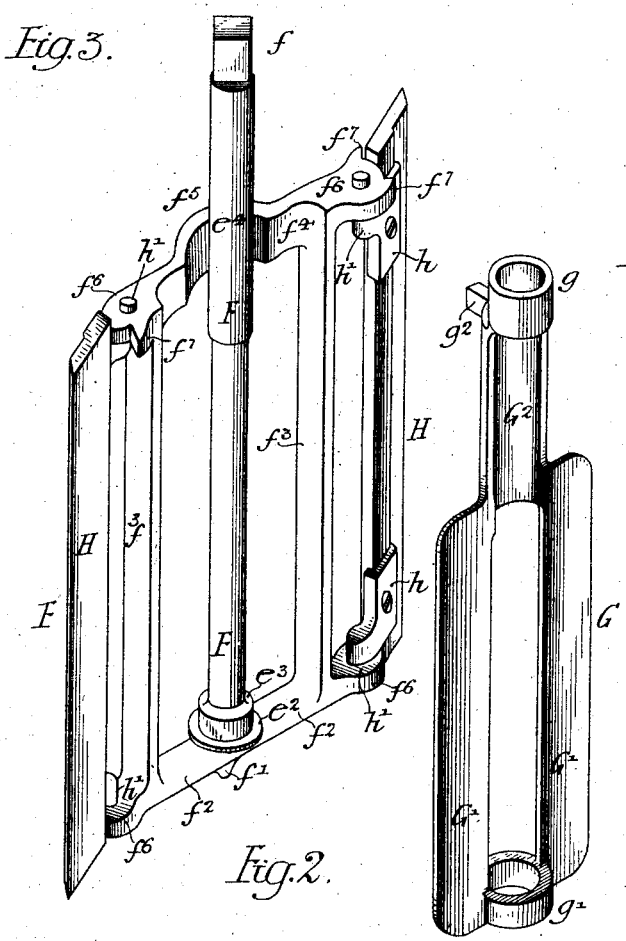
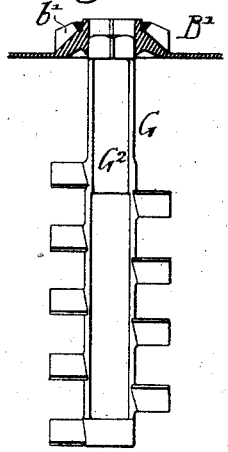
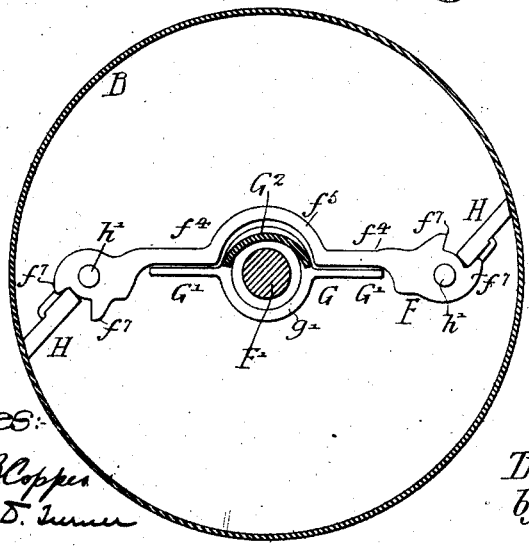
Inventor
Thomas J. Fegley,
by his Attorneys
Howson & Howson

UNITED STATES PATENT OFFICE.

THOMAS J. FEGLEY, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

ICE-CREAM FREEZER.

No. 882,936.  Specification of Letters Patent.  Patented March 24, 1908.

Application filed April 10, 1906. Serial No. 310,958.

*To all whom it may concern:*

Be it known that I, THOMAS J. FEGLEY, a citizen of the United States, residing in Philadelphia, Pennsylvania, have invented certain Improvements in Ice-Cream Freezers, of which the following is a specification.

The object of my invention is to construct a double dasher ice cream freezer which will be simple in construction and in which the central dasher can be readily removed without disturbing the main dasher to which the scrapers are attached.

In the accompanying drawings: Figure 1, is a vertical sectional view of an ice cream freezer illustrating my invention; Fig. 2, is a sectional plan view on the line 2—2, Fig. 1; Fig. 3, is a detached perspective view of the main dasher; Fig. 4, is a detached perspective view of the central dasher, and Fig. 5, is a modified form of the central dasher showing a portion of the cap.

A is the tub of an ice cream freezer, secured to the bottom of the tub is a step bearing plate $a$ for the bottom pivot $b$ of the can B. This can is provided with a cover or lid B' and a lug $b^2$ on the cover engages a lug $b^3$ on the can so that when the cover is turned the can will turn with it. Forming part of this cover is a bevel gear wheel $b'$ with which meshes the bevel gear wheel $c$ on the shaft C mounted in bearings $d$ $d$ on the cross bar D.

The cross bar D has a cap D' from which depends a stud $d'$, a bevel wheel $e$ is mounted on this stud and meshes with the bevel wheel $c$ on the shaft C. This bevel wheel $e$ has a long hub $e'$ the opening in which is squared to receive the squared end $f$ of the central stem F' of the main dasher F, so that when the shaft C is turned by its handle C' or by power it will turn the dasher F in one direction through the gear wheel $e$ and the can in the opposite direction through the gear wheel $b'$.

The main dasher F has a pivot $f'$ mounted in a socket in the bottom of the can and has transverse arms $f^2$ extending from each side of the central stem F' near the lower end of the dasher, these arms support the dasher frame consisting of the uprights $f^3$, $f^3$ and the connecting member $f^4$ which extends from one upright to the other at the upper end of the dasher, as clearly shown in Fig. 3. This member $f^4$ however, is not attached to the stem F' but is curved at $f^5$ so as to clear it, leaving a space for the insertion of the central dasher G shown clearly in Fig. 4.

H, H are the scrapers of the ordinary type made of wood in the present instance and having metal plates $h$ on which are the pivot pins $h'$, these pins are mounted in bearings $f^6$ projecting from the main dasher. Stops $f^7$ are provided to limit the movement of the scrapers.

The central dasher G is formed as shown in Fig. 4, having a bearing $g$ at the top and a bearing $g'$ at the bottom through both of which extends the central stem F' of the main dasher, the central dasher rests on the annular seat $e^2$ and the bearings snugly fit the portions $e^3$ and $e^4$ of the stem F'.

In the lid B' as shown in Fig. 1, is a circular opening $b^4$, the upper end of the central dasher snugly fits this opening and has a lug $g^2$ which is engaged by a lug $b^5$ on the lid B' so that the central dasher must turn with the can. In place of the lugs the can may have a squared opening for the reception of the squared end of the central dasher as shown in Fig. 5.

The central dasher G is made with two solid wings G' and a half curved connecting portion $G^2$. The wings can be of any shape desired either solid as shown, or provided with a series of arms as in Fig. 5. The portion $G^2$ is curved so as to allow the stem F to pass freely through the dasher G and have its only bearing at top and bottom.

It will be noticed in referring to Figs. 2 and 3, that the upper bar $f^4$ of the main dasher F is at one side of the center so that the wings G' will readily pass it, and the distance between the curved portion $f^5$ of the bar and the stem F' is such that the lower bearing $g'$ will pass through the opening, thus the central dasher can be readily removed from the can without removing the main dasher. This is desirable in this class of ice cream freezers as when the ice cream is worked to a certain point it can be completed and worked down better with the central dasher removed.

It will be seen by the above described construction that the can is turned directly from the main driving shaft and the central dasher is driven indirectly through the can lid, the only connection between the can and the central dasher is at the top. Therefore, there is no bottom connection with the can so that the central dasher can be readily removed without disturbing the position of the main dasher whose pivot is mounted in a bearing in the bottom of the can. The upper bearing is such that the central dasher can be readily removed.

I claim:—

1. The combination in an ice cream freezer, of a can, a main dasher consisting of a rectangular frame having a central spindle and made with the top member offset around said spindle, and a central dasher, said central dasher being removable from the can through the space left by said offset member of the main dasher, substantially as described.

2. The combination in an ice cream freezer, of a can and its lid, a main dasher having a bearing in the bottom of the can, a central dasher consisting of two rings and two blades connecting the same, said rings being arranged to serve as positioning means for said central dasher and the parts being arranged to permit the withdrawal of the central dasher independently of the main dasher, substantially as described.

3. The combination in an ice cream freezer, of a can having a lid, a main dasher including a flat frame having an offset top member, a central dasher arranged to rotate within the main dasher, said central dasher being removable through the space provided by the offset portion of the main dasher, substantially as described.

4. The combination in an ice cream freezer, of a tub, a cross bar, a driving shaft carried by the cross bar and having a bevel wheel, a stud on the upper portion of the cross bar, a bevel wheel mounted on the stud engaging with the driving bevel wheel said bevel wheel having a projecting hub with a squared opening therein, a can mounted in the tub, a cap for the can, a bevel wheel on the cap meshing with the driving bevel wheel, said lid having an opening, a main dasher having a pivot mounted in a socket in the bottom of the can and having a central stem extending through the opening in the lid and shaped to fit the squared opening in the hub of the upper bevel wheel so that said dasher is driven by said bevel wheel in one direction, a central dasher having a portion extending into the opening in the can lid and connected thereto so that it will be turned with the can in a direction opposite to that of the main dasher, substantially as described.

5. The combination in an ice cream freezer, of a tub, a cross bar, gearing carried by the cross bar, including driving and driven bevel gears, a can pivoted in the tub, a lid for the can, a bevel wheel carried by the lid and engaging the driving bevel wheel, a main dasher having its pivot mounted in the bottom of the can and consisting of a central stem extending through the lid and into the hub of the driven gear, arms at the base and uprights extending from the arms, scrapers carried by the uprights, and a connecting member connecting the upper ends of the uprights and curved around the stem, with a central dasher having its lower bearing on the main dasher and having its upper bearing in the can lid and arranged to turn with the lid, said dasher consisting of side wings and a curved connecting portion passing up between the stem and the connecting portion of the main dasher, the parts being so arranged that the central dasher can be removed without disturbing the main dasher, substantially as described.

6. The combination in a double dasher for ice cream freezers, consisting of a main dasher mounted in the can, scrapers attached to the main dasher, said main dasher having a stem extending from the base through the lid of the can and forming the driving member for the dasher, with a central dasher having its lower bearing on the stem of the main dasher and having a driving member in the form of a segment extending partly around the stem of the main dasher, the stem of the main dasher passing through the upper bearing of the central dasher, with means for driving the dashers in opposite directions, substantially as described.

7. The combination in an ice cream freezer, of a tub, a can mounted in the tub, a lid on the can, means for driving the lid, connections between the lid and the can by which the can is driven from the lid, a main dasher mounted in the can and having a central stem extending through the opening in the lid, means for driving the main dasher, a central dasher having its upper bearing in the lid, a lug on the lid and a lug on the central dasher, so that the central dasher will turn with the lid, substantially as described.

In testimony whereof, I have signed my name to this specification, in the presence of two subscribing witnesses.

THOMAS J. FEGLEY.

Witnesses:
WILL. A. BARR,
JOS. H. KLEIN,